United States Patent [19]
Frank

[11] 3,786,259
[45] Jan. 15, 1974

[54] METHOD AND APPARATUS FOR OPTIMIZING MEASUREMENT OF RADIOACTIVITY OF SAMPLES IN SCINTILLATION TYPE COUNTER

[75] Inventor: Edmund Frank, Chicago, Ill.

[73] Assignee: Packard Instrument Company, Inc., Downers Grove, Ill.

[22] Filed: Apr. 7, 1972

[21] Appl. No.: 241,988

[52] U.S. Cl. .................. 250/106 SC, 250/71.5 R
[51] Int. Cl. ............................................. G01t 7/08
[58] Field of Search ................ 250/71.5 R, 106 SC

[56] References Cited
UNITED STATES PATENTS
3,283,151  11/1966  Rowan et al. ................ 250/71.5 R
FOREIGN PATENTS OR APPLICATIONS
897,852  5/1962  Great Britain ............... 250/106 SC

*Primary Examiner*—Archie R. Borchelt

[57] ABSTRACT

A method and apparatus for optimizing the measurement of the radioactivity of samples in a scintillation type radioactivity counter in which successive samples are advanced into a counting chamber where the radioactivity of each sample is measured by detecting and counting the scintillations induced in a scintillation medium. In order to optimize the position of the sample relative to the scintillation detecting means, and thereby optimize measurement of the radioactivity of each sample, control means are provided for producing a command signal representing a selected position of the sample relative to the scintillation medium. This control means includes adjusting means for automatically adjusting the stop position of the sample in response to each command signal so that the sample is automatically stopped at a position represented by the command signal, and at which measurement of the radioactivity of the sample is optimized. Specific adjusting means disclosed are in adjustable limit switch and an adjustable wiper on a potentiometer, each of which controls the drive motor for raising and lowering successive samples relative to a counting chamber.

13 Claims, 7 Drawing Figures

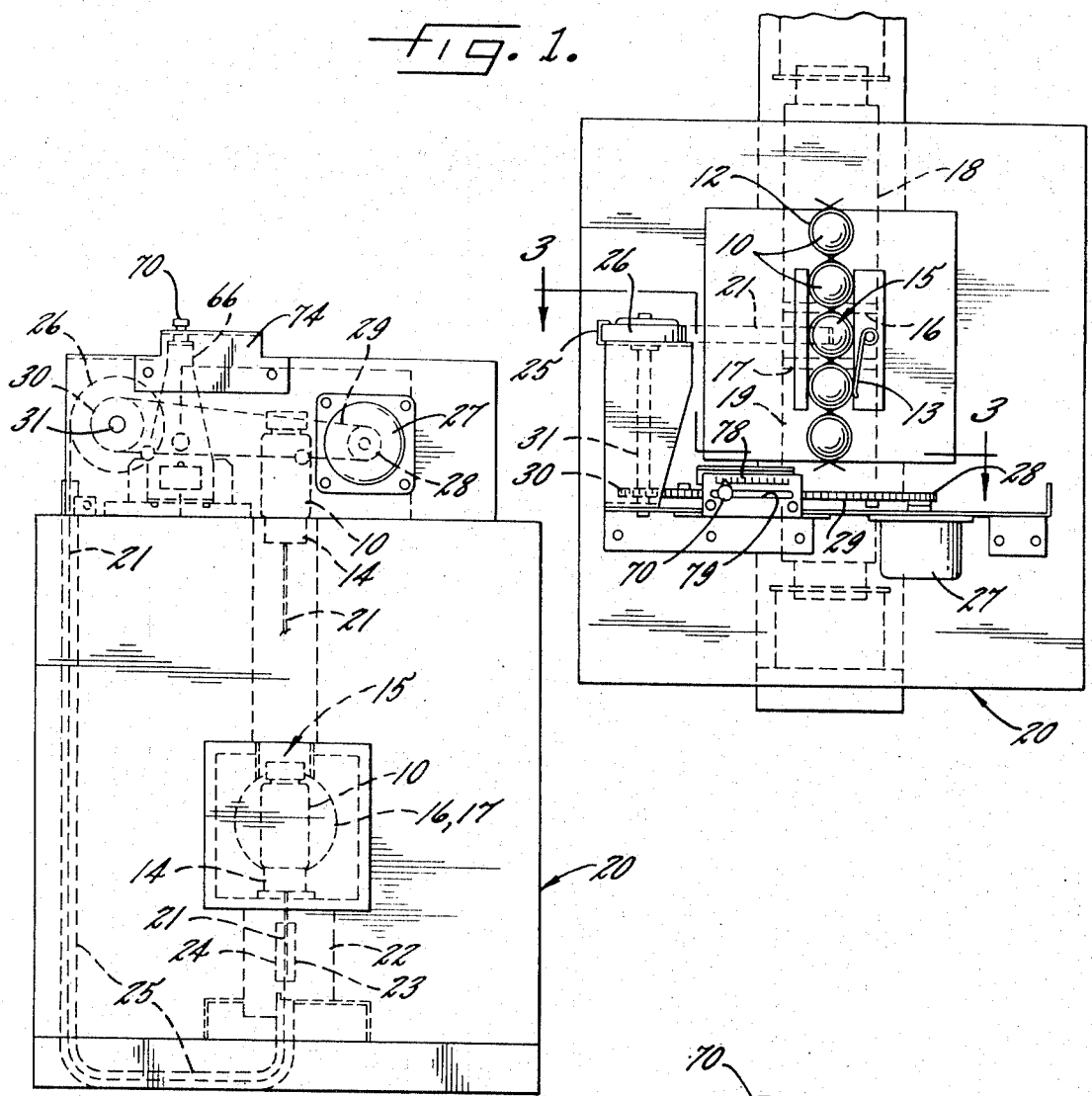
Fig. 1.
Fig. 2.
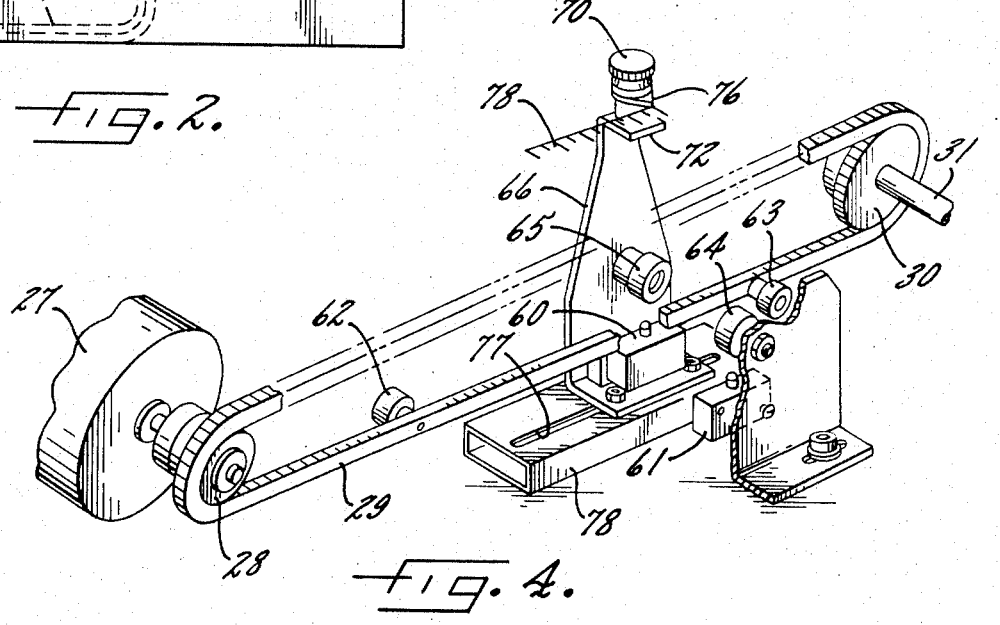
Fig. 4.

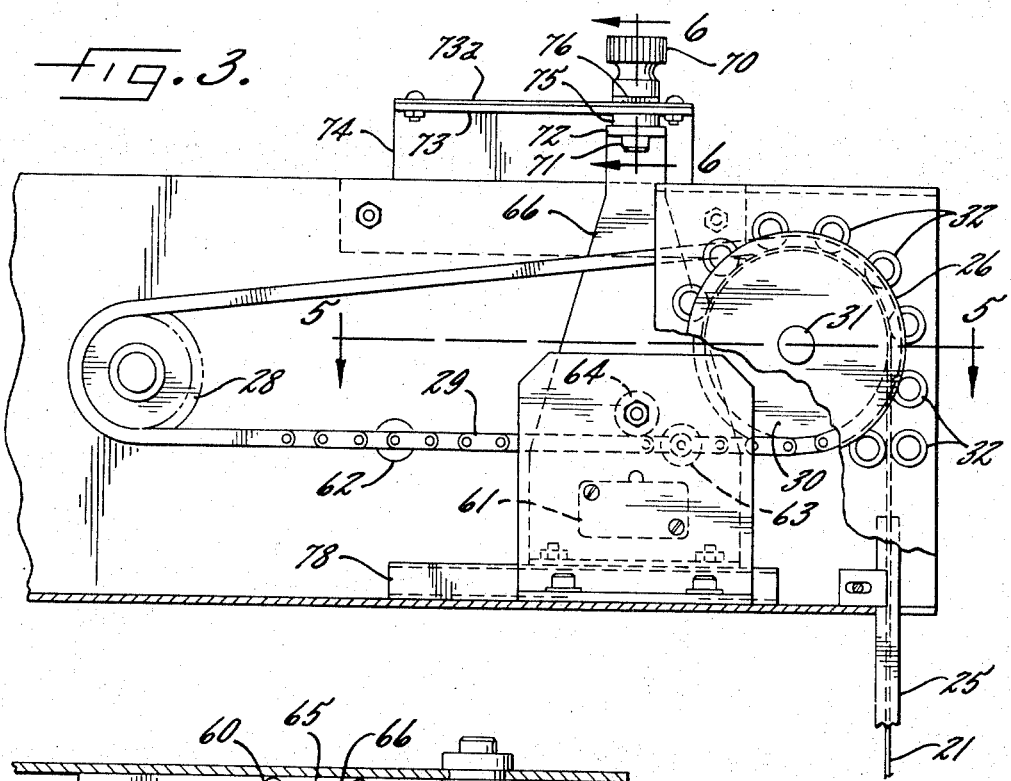
Fig. 3.
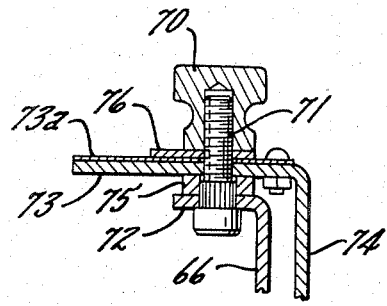
Fig. 5.
Fig. 6.

METHOD AND APPARATUS FOR OPTIMIZING MEASUREMENT OF RADIOACTIVITY OF SAMPLES IN SCINTILLATION TYPE COUNTER

The present invention relates generally to systems for measuring radioactivity and, more particularly, to an improved method and apparatus for optimizing the measurement of radioactivity of samples in scintillation type radioactivity counters.

It is a primary object of the present invention to provide an improved scintillation type radioactivity measuring system which permits the optimizing of measuring conditions for a large number of successive samples which vary quantitiatively over a wide range.

Another object of the invention is to provide an improved scintillation type radioactivity measuring system of the foregoing type which is simple to operate and which can be efficiently manufactured and maintained.

A more specific object of one particular application of the invention is to provide an improved system for optimizing conditions for measuring gamma radiation from samples contained in sample vials of uniform size, but in which the quantity of sample material contained in the vials varies widely over a large number of vials.

Other objects and advantages of the invention will be apparent from the following detailed description taken in connection with the accompanying drawings, in which:

FIG. 1 is a top plan view of a scintillation detector embodying the invention;

FIG. 2 is a side elevation of the detector of FIG. 1;

FIG. 3 is an enlarged section taken along line 3—3 in FIG. 1;

FIG. 4 is an enlarged perspective of the switching arrangement associated with the elevator drive system in the detector of FIG. 1;

FIG. 5 is a section taken along line 5—5 in FIG. 3;

FIG. 6 is an enlarged section taken along line 6—6 in FIG. 3; and

Figure 7:
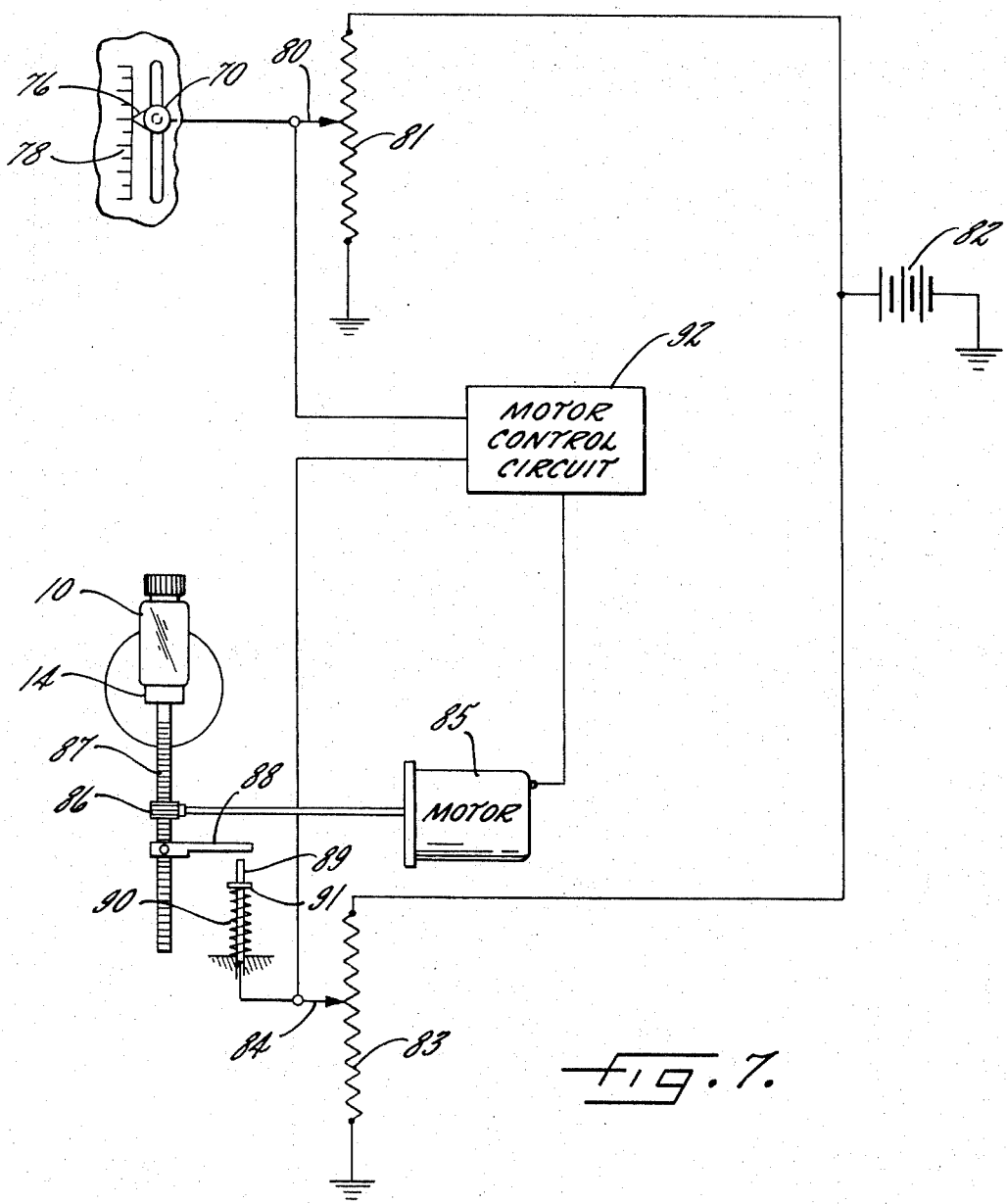
FIG. 7 is a schematic diagram of an alternative switching arrangement associated with the elevator drive system in the detector of FIG. 1.

While the invention will be described in connection with certain preferred embodiments, it is to be understood that the invention is not limited to these particular embodiments. On the contrary, it is intended to cover all alternatives, modifications and equivalent arrangements as may be included within the spirit and scope of the invention.

Turning now to the drawings and referring first to FIGS. 1 and 2, a plurality of radioactive samples contained in vials 10 are advanced in seratim past a fixed counting station 11. In the particular arrangement illustrated the sample vials 10 are carried in vertical compartments formed by flexible belt 12 forming vial compartments which are open at both the top and the bottom. Each time a sample vial 10 is advanced into alignment with the counting station 11, as determined by a sensing switch 13, the aligned vial rests on an elevator platform 14 which automatically lowers the sample vial into a counting chamber 15 where the radioactivity of the sample is automatically measured.

In a detector of the type illustrated, the counting chamber 15 is typically designed to measure gamma radiation by means of a pair of thallium-activated sodium iodide crystals 16 and 17 positioned on opposite sides of the counting chamber and mounted on a corresponding pair of light-sensing photomultiplier tubes 18 and 19, respectively. As is well known, the gamma radiation produces light scintillations in the crystals, and these scintillations are converted to corresponding voltage pulses by means of the photomultipliers 18 and 19. The energy level of the gamma rays is determined by the intensity of the light scintillations and the amplitude of the corresponding voltage pulses, while the rate at which the gamma rays are emitted is determined by the frequency of the light scintillations and the corresponding voltage pulses In order to shield the counting chamber and particularly the crystals 16 and 17 from background radiation from extraneous sources, the counting chamber is shielded on all sides by means of a plurality of lead blocks contained within the external housing 20. This lead shielding makes the detector relatively bulky, and thus it is desirable to minimize the size of the sample transfer mechanism in order to make the overall size of the detector as small as possible. Thus, in the illustrative instrument the elevator mechanism includes an elongated metal tape 21 secured to the bottom of the elevator platform 14 and extending downwardly through the counting chamber 15 and registered apertures formed in the lead shielding below the counting chamber. One of the lead shielding blocks 22 holds a pair of bearing pads 23 and 24 for supporting and guiding the tape 21 as it passes back and forth through the bottom shielding. Directly beneath the bearing pads 23 and 24, the tape 21 enters a generally U-shaped tape guide 25.

In order to minimize the vertical dimension of the elevator mechanism, the tape guide 25 bends the tape 21 horizontally directly beneath the lead shielding so that the tape extends transversely away from the vertical axis of the counting chamber, and the guide 25 then bends the tape vertically up through a side portion of the lead shielding to a reel 26.

The reel 26 is driven by a reversible electric motor 27 via sprocket 28 on the motor shaft and a chain 29 meshing with the sprocket 28 and a second sprocket 30 fixed to the shaft 31 of the reel 26. As the reel is rotated in the counterclockwise direction as viewed in FIG. 2, the tape 21 is advanced upwardly through the counting chamber to raise the elevator platform 14 to its raised position at the top of the housing 20. When the reel is driven in the clockwise direction as viewed in FIG. 2, the tape 21 is lowered through the counting chamber to position a sample vial carried by the elevator within the counting chamber. In order to provide the elevator tape 21 with sufficient rigidity to support the elevator platform throughout the entire length of its vertical travel, the tape is curved in the direction transverse to its direction of movement. To hold the tape in a compact coil on the reel 26, a plurality of roller bearings 32 are mounted at equally spaced positions around the reel 26 to hold that portion of the tape that is wound on the reel in the form of a circular coil. The spring action of the tape 21 continuously urges the tape toward a straight longitudinal configuration and thus biases the tape that is wound onto the reel 26 outwardly against the roller bearings 31.

The elevator mechanism that has been briefly described above is described in more detail in my copending application Ser. No. 241,987 entitled "Elevator Mechanism for Scintillation Detectors and the Like,"

filed concurrently herewith and assigned to a common assignee.

In accordance with the present invention, switching means are provided for automatically controlling the raised and lowered positions of a vial carried by the sample elevator, and adjusting means are provided for adjusting the lowered position of the sample so that the sample can be located at a selected position at which the production of scintillations is optimized, thereby optimizing measurement of the radioactivity of the sample. Thus, in the illustrative arrangement, a pair of limit switches 60 and 61 are mounted adjacent the elevator drive chain 29 for actuation by a pair of respective switch actuators 62 and 63 carried by the chain. As the elevator is raised, the actuator 63 advances toward the switch 61 (to the left as viewed in FIGS. 3 and 4) and is cammed downwardly against the switch 61 by means of a stationary cam 64 mounted directly over the switch 61. When the switch 61 is actuated, it stops the elevator drive motor with the elevator platform in its raised position where the top surface of the platform is aligned with the transport surface over which the samples are transported to and from the counting well. During lowering movement of the elevator, the switch actuator 62 advances toward the switch 60 (to the right as viewed in FIGS. 3 and 4) and is cammed downwardly against the switch 60 by means of a cam 65 mounted on an adjustable bracket 66. When the switch 60 is actuated, it de-energizes the elevator drive motor to stop the elevator platform in a preselected "down" position determined by the position of the bracket 66 along the longitudinal axis of the elevator drive chain.

In keeping with the invention, a manually operated knob 70 is threaded onto the upper end of a stud 71 secured to a lateral flange 72 on the upper end of the adjustable bracket 66. The shank portion of the stud 71 also passes through a lateral flange 73 formed at the top of a stationary plate 74 bolted to a sidewall of the elevator drive frame. A nut 75 is disposed around the stud 71 between the flanges 72 and 73, and a pointer 76 is keyed to the stud 71 below the knob 70 (FIG. 6). When the knob 70 is threaded tightly onto the stud 71, the bracket 66 is clamped tightly against the stationary flange 73 to hold the bracket 66 and the switch 60 and cam 65 carried thereon in the selected position. When the knob 70 is threaded upwardly, the bracket 66 is released for sliding movement along a guiding slot 77 formed in its mounting pedestal 78, with the stud 71 sliding along a guiding slot 79 formed in the flange 73. As the bracket 66 is moved back and forth along the slot 77, the pointer 76 is moved along a scale S printed on the upper surface of a thin plate 73a secured to the top of the flange 73. The scale S is calibrated to correlate the position of the pointer 76 with the position of the top surface of the elevator platform within the counting chamber 15, thereby providing an indication to the spectrometer operator of the particular "down" position represented by any given position of the bracket 66.

One of the problems encountered in the operation of detectors of the type illustrated is that the samples often vary in volume, while the sample vials are of constant volume. Consequently, there is a variation in the height of the samples above the bottoms of the vials, so that samples with different volumes will have different positions relative to the scintillation crystals. This variation in the positions of the samples relative to the crystals causes a variation in counting rates, so that all the samples are not counted at their optimum counting rates. The optimum counting rate is generally considered to be the maximum counting rate, i.e., the rate produced when the sample is located at the position where it induces scintillations in the detection crystals at a maximum rate. In general, detectors of the type illustrated include a visual display of the counting rate, so that as any given sample is lowered through the counting chamber the operator can visually determine the particular position at which the counting rate is optimized, or maximized. Thus, by observing the counting rate with the knob 70 in its released position, the operator can move the bracket 66 to stop the downward movement of the sample at the particular position in the counting chamber where the counting rate is optimized. The knob 70 is then turned to its clamped position and the counting of the sample proceeds in the usual manner.

In FIG. 7 there is illustrated an alternative switching arrangement for adjusting the down position of the elevator in order to optimize the counting rate for different samples. In this arrangement, the knob 70 is connected to the wiper 80 of a potentiometer 81, rather than an adjustable bracket 66. The potentiometer 81 is part of a bridge network including a voltage source 82 and a potentiometer 83 having a wiper 84 controlled by a mechanical element moving in synchronism with the elevator. In the particular arrangement illustrated, a motor 85 drives the elevator platform via a pinion 86 and rack 87, and the rack 87 carries an arm 88 which engages the top of a vertically movable plunger 89 as the elevator traverses the counting chamber. The plunger 89 is normally biased to its uppermost position, as illustrated in FIG. 7, by means of a biasing spring 90 bearing against the underside of a flange 91 formed as an integral part of the plunger. The arm 88 is positioned relative to the top of the plunger 89 so that it initially engages the top of the plunger 89 when the sample vial is at the top of the counting chamber. Then as the sample vial is lowered through the counting chamber, the arm 88 depresses the plunger 89 to move the wiper 84 along the potentiometer 83.

When the wiper 84 reaches a position where the signal across potentiometer 83 balances the signal across the potentiometer 81, a motor control circuit 92 connected to both wipers 80 and 84 de-energizes the drive motor 85 to stop the downward movement of the sample elevator. Thus, it can be seen that by adjusting the position of the wiper 80 by manual movement of the knob 70, the operator can adjust the down position of the elevator in a manner similar to that effected by the mechanical movement of the bracket 66 carrying the limit switch 60 in the arrangement of FIGS. 3–5. While the motor control circuit 92 is not shown in detail herein, it will be understood that it may take the form of a conventional bridge circuit which produces an output signal to energize the motor 85 whenever there is a difference in the signals across the two potentiometers 81 and 83, and which is nulled to de-energize the motor 85 when the signals across the potentiometers 81 and 83 are equalized.

While the invention has been described with specific reference to a scintillation detector in which the scintillation medium comprises a part of the counting chamber, it will be appreciated that the invention is equally applicable to a scintillation detector in which the scintillation medium is carried in the sample vial. For example, in liquid scintillation detectors the sample is usually mixed with a liquid scintillator in the sample vial, and thus there is no need for scintillation crystals in the counting chamber. When the sample vial containing the liquid scintillator is lowered into the counting chamber, the light pulses induced in the liquid scintillation medium by the radioactive sample are detected by photomultipliers disposed on opposite sides of the sample vial within the counting chamber, and these light pulses are then converted into voltage pulses in the same manner described above.

As can be seen from the foregoing detailed description, this invention permits the optimizing of measuring conditions for a large number of successive samples which vary quantitatively over a wide range. Thus, as successive samples vary in volume, the operator can observe the counting rate for any given sample as it is advanced toward and through the counting chamber, and adjusts the stop position of the sample by simply turning the knob 70 and sliding it to the left or right. The optimizing adjustment is simple to operate, can be efficiently manufactured, and requires little or no maintenance.

I claim as my invention:

1. Apparatus for optimizing the measurement of the radioactivity of samples in a scintillation type radioactivity counter, said apparatus comprising the combination of a counting station including means for detecting light scintillations induced by the radioactive sample in a scintillation medium, conveyor means for advancing a sample relative to said detecting means to position the sample adjacent said detecting means, automatic stop means connected to said conveyor means for stopping the advancement of the sample relative to said detecting means at a predetermined position, control means for producing a command signal representing a selected position of the sample relative to said detecting means at which the detection of said scintillations is optimized, and adjustment means connected to said control means and said automatic stop means for adjusting said stop means in response to said command signal to stop the advancement of the sample relative to said detecting means at said selected position at which the detection of said scintillations is optimized whereby measurement of the radioactivity of the sample is optimized.

2. Apparatus as set forth in claim 1 wherein a fixed scintillation medium is associated with said detecting means so that the positioning of the sample relative to said detecting means also positions the sample relative to said fixed scintillation medium.

3. Apparatus as set forth in claim 2 wherein said scintillation medium comprises at least one crystal for detecting gamma radiation.

4. Apparatus as set forth in claim 1 wherein said conveyor means comprises an elevator for raising and lowering the sample through a counting chamber containing said detecting means.

5. Apparatus as set forth in claim 1 wherein said automatic stop means comprises a switch actuator connected to said conveyor means for movement in response to movement of said conveyor means, and a limit switch positioned to be actuated by said switch actuator for de-energizing said conveyor means when the sample is at said selected position relative to the scintillation medium.

6. Apparatus as set forth in claim 5 wherein said control means comprises a manually operable controller for commanding said selected position of the sample relative to said detecting means, and said adjustment means comprises means for adjusting the position of said limit switch in response to movement of said manually operable controller.

7. Apparatus as set forth in claim 1 wherein said control means comprises a manually operable controller associated with a dial that is calibrated to indicate the sample stop positions corresponding to different positions of said manually operable member.

8. Apparatus as set forth in claim 1 wherein said control means comprises a manually operable controller for commanding said selected position of the sample relative to said detecting means, said automatic stop means comprises a bridge network including a first potentiometer having a wiper connected to said conveyor means for movement in response to movement of said conveyor means, and said adjustment means comprises a second potentiometer included in said bridge network and having a wiper connected to said controller for movement in response to movement of said controller, said bridge network being connected to said conveyor means for de-energizing said conveyor means when the wipers of said first and second potentiometers are positioned to produce balancing signals.

9. A method of optimizing the measurement of the radioactivity of samples in a scintillation type radioactivity counter, said method comprising the steps of advancing a sample relative to a counting station including means for detecting light scintillations induced by the radioactive sample in a scintillation medium to position the sample adjacent said detecting means, stopping the advancement of each sample at a predetermined position relative to said detecting means, counting the scintillations detected as each sample is advanced relative to said detecting means, selecting the position at which the sample is stopped in accordance with the rate at which the scintillations are detected as the sample is advanced relative to said detecting means so that the sample is stopped at a position at which the detection of said scintillations is optimized, thereby optimizing measurement of the radioactivity of the sample, and measuring the radioactivity of each sample while the sample is stopped at said selected position at which the detection of said scintillations is optimized.

10. A method as set forth in claim 9 wherein samples of different volumes are stopped at different selected positions relative to said detecting means so that the detection of said scintillations is optimized for samples having different volumes.

11. A method as set forth in claim 9 wherein a fixed scintillation medium is associated with said detecting means so that the positioning of the sample relative to said detecting means also positions the sample relative to said fixed scintillation medium.

12. A method as set forth in claim 11 wherein the scintillation medium comprises at least one crystal for detecting gamma radiation.

13. A method as set forth in claim 9 wherein the position at which the radioactivity of each sample is measured is the position where the rate of production of said scintillations is a maximum.

* * * * *